United States Patent [19]

Lilyerd

[11] 4,440,112
[45] Apr. 3, 1984

[54] FREEZE-PROOF LIVESTOCK WATERING DEVICE AND METHOD

[76] Inventor: J. R. Lilyerd, Rte. #4, Mora, Minn. 55051

[21] Appl. No.: 376,422

[22] Filed: May 10, 1982

[51] Int. Cl.³ .............................................. A01K 7/04
[52] U.S. Cl. ......................................... 119/73; 119/78
[58] Field of Search .................................... 119/73, 78

[56] References Cited

U.S. PATENT DOCUMENTS

| | | | |
|---|---|---|---|
| 1,655,674 | 1/1928 | Cronenberger et al. | 119/73 |
| 1,977,346 | 10/1934 | Moorman | 119/73 |
| 3,306,263 | 2/1967 | Johnson | 119/73 |
| 3,841,268 | 10/1974 | Bunger | 119/73 |

Primary Examiner—Hugh R. Chamblee
Attorney, Agent, or Firm—John W. Adams

[57] ABSTRACT

A freeze-proof livestock watering device comprising an open-topped drinking reservoir having insulated side walls and a heat conductive bottom panel constructed and arranged to produce a very low-cost operation by incorporating a combination of low-volume turbulence-producing jets and apparatus for providing a heat transfer relationship between the bottom of the drinking reservoir and the above-freezing, sub-frost level ground temperatures. A float valve is also provided to maintain a minimum water level while the livestock are drinking from the pan, and an overflow drain is provided to maintain a maximum water level during inactive periods of use. A thermostatic control valve may be provided to control the discharge of water through the jets in accordance with the water temperature in the pan, and a protective hood is provided over the float valve and drain outlet to prevent freezing thereof.

A new method is also provided for supplying water for livestock in a manner which prevents freezing thereof and includes discharging turbulence-producing water through discharge jets into a drinking reservoir simultaneously with transmitting above-freezing, sub-frost level ground temperature air into heat conductive contact with a portion of the water reservoir while maintaining a minimum water level within the drinking reservoir during usage.

11 Claims, 2 Drawing Figures

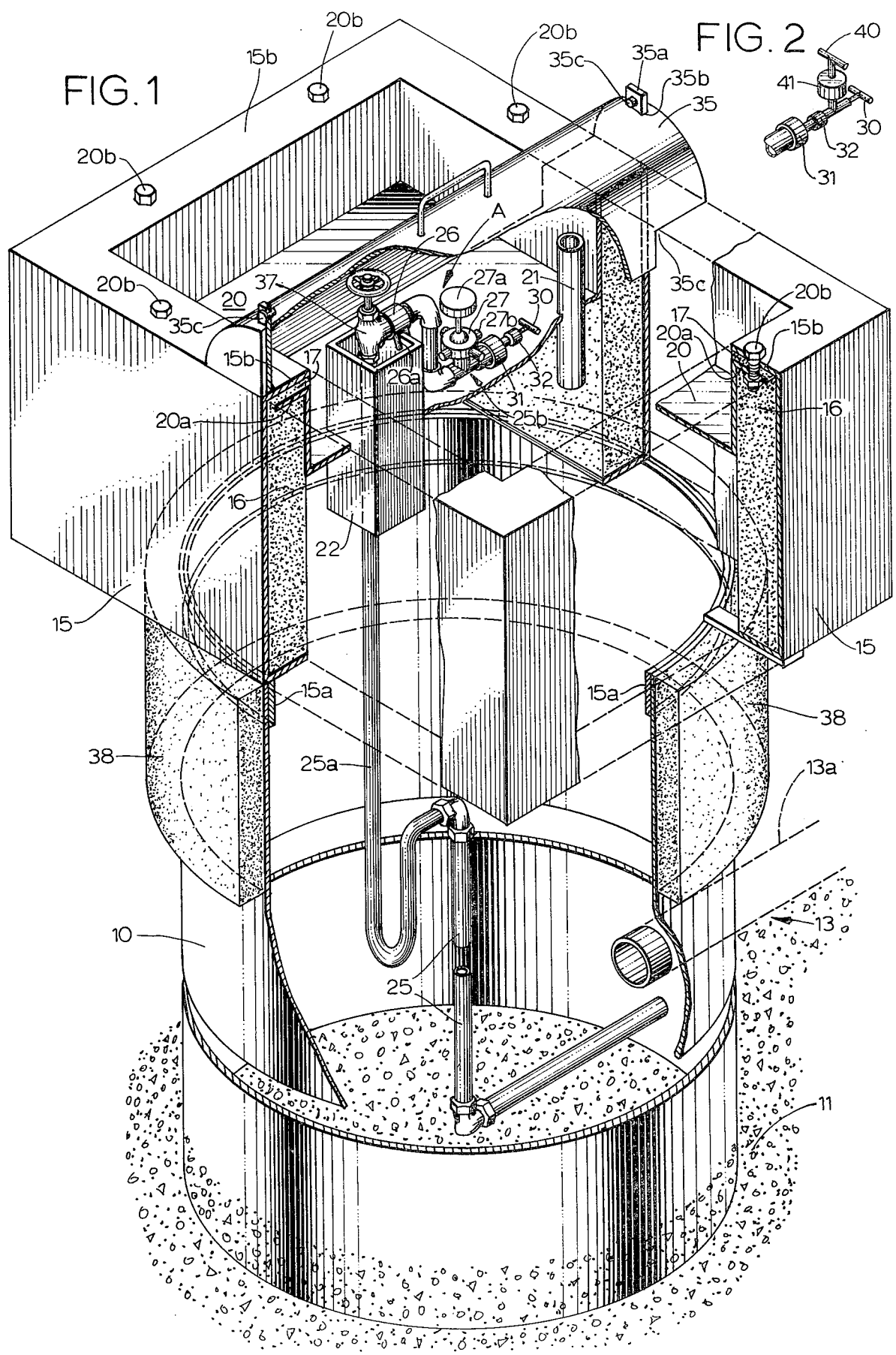

FREEZE-PROOF LIVESTOCK WATERING DEVICE AND METHOD

BACKGROUND OF THE INVENTION

In cold climates, livestock watering devises present numerous problems particularly in the winter where freeze-ups frequently occur. Livestock watering devices are conventionally placed outside, thus creating the freezing problem. It is difficult to maintain the water in a liquid condition when the temperatures fall substantially below the freezing point. A number of prior art watering devises have been developed, some of which require the use of auxiliary electric heat to prevent freezing and while this works reasonably well to prevent freezing, it also is very expensive to operate.

SUMMARY OF THE INVENTION

The present invention includes a large, hollow supporting member which extends downwardly into the ground a substantial distance below the frost line, thus providing direct communication with above-freezing temperatures. A reservoir pan is mounted directly on the top of said hollow supporting member and has insulated side walls and a thermally conductive bottom panel of substantially the same size as the top of the hollow supporting member. A water supply conduit extends upwardly through the hollow supporting member into the reservoir pan. A plurality of low-volume, turbulence-producing jets are connected to the supply conduit whereby water will be continuously discharged through said jets to produce a limited constant supply of above-freezing water and also produce constant turbulence in the reservoir to prevent the water from freezing during cold weather. This system also provides a constant supply of cool, fresh water substantially free from algea in the summer. A float valve is connected to the supply conduit independently of the agitating jets to replace water consumed by the livestock and maintain a minimum water level within the reservoir. A hollow stand pipe extends upwardly through the bottom of the reservoir pan to provide communication with the above-freezing air in said hollow support member and prevent overflow of the reservoir. A protective hood covers the top of the stand pipe to trap the warm air moving upwardly therethrough and to overlie and protect the float and stand pipe area against freezing. The supply conduit extends upwardly through the overflow stand pipe to be confined under said hood and thus prevent freezing of the water in the conduit.

A new method is also provided which includes providing an open-topped drinking reservoir, producing turbulence in said reservoir by means of continuously discharging, limited volume jets and affording heat conductive transfer between the below ground, above-freezing air and a portion of the reservoir while maintaining a minimum water level in said reservoir during usage by means of a float valve independent of said jet supply.

DESCRIPTION OF THE DRAWINGS

FIG. 1 is a perspective view showing the invention; and

FIG. 2 is fragmentary perspective view showing a modified form of the invention.

DETAILED DESCRIPTION

As illustrated in the accompanying drawings, a hollow support member 10 is provided which extends downwardly into the ground substantially below the frost level. In most colder climates in the United States, this frost level is from two to three feet below the ground surface. Suitable drainage such as coarse aggregate 11 is provided at the bottom of the stand pipe for drainage of overflow water into the ground. An overflow drain system is also provided such as the drain field 13 having a perforated drain tile 13a connected into an intermediate portion of the hollow support member 10 as illustrated to provide drainage if the water rises to that level within member 10.

In the form shown, the top of the support member 10 is at the ground surface level. A pan support housing 15 is mounted on the top of the support member and is held in place by a short sleeve section 15a fixed to the bottom of housing 15 as by being welded thereto. The sleeve extends downwardly in telescoping relation into the upper end portion of the hollow support member 10 to retain the housing 15 in position thereon. The side walls of the housing are provided with a substantial thickness of insulation such as four inches of polystyrene insulation material 16 shown in the drawing.

A reservoir pan 20 is provided in the upper portion of the housing 15 and has an upper flange 20a which underlies an inwardly extending flange 15b of the housing 15 and is spaced therebelow. Insulation 17 is inserted between the two flanges to prevent direct thermal conduction between outer housing 15 and the inner reservoir pan 20. Suitable bolts 20b connect the two flanges.

In the form shown, a pair of hollow stand pipe elements 21 and 22 extend through the pan bottom 20 and provide communication between the upper portions of the reservoir and the lower portion of the hollow support member. The stand pipe 21 is somewhat smaller than the stand pipe 22 and terminates at its upper end approximately two inches below the top of the housing 15, as shown. This pipe forms the conventional overflow to normally limit the level of water within the pan. Stand pipe 22 is larger than stand pipe 21 and provides a hollow stack member, the upper end of which terminates approximately one inch below the top of the housing 15 as shown and is designed to provide a warm air passage from the interior of support member 10 and thus, afford communication with the warm (above-freezing ground temperature) air in the support member and the upper water supply apparatus to be described.

A water supply conduit 25 enters the lower portion of the support member 10 at a point below the frost line and extends upwardly through member 10 and through the hollow stack member 22, as illustrated. The upper portion of the conduit 25 comprises a flexible tube 25a which permits the jet and float valve assembly A to be lifted out of the reservoir pan 20 as will be hereinafter described.

The flexible supply conduit 25a passes up through the stand pipe 22 and has a rigid coupling 26 extending across the top edge of the stand pipe 22. The coupling 26 is provided with stabilizing legs 26a to support the assembly A in the pan 20. A submerged section 25b is connected to coupling 26 and is disposed in close proximity to the pan bottom 20, as shown. The coupling 26 is provided with stabilizing legs 26a which straddle the upper edge of the stand pipe 22 as shown and permit the entire submerged section 25b to be lifted off of the stand pipe 22 for servicing. The submerged conduit section 25b provided with a conventional float valve 27 having a plurality of radially extending nozzles 27b, and having a float 27a which controls the discharge of water into the tank through the valve element 27 and maintains a minimum water level when the livestock are drinking. A pair of turbulence-producing, limited discharge jets 30 are provided at the end of the submerged conduit section 25b and in the form shown, these jets discharge a relatively small volume of water adjacent the bottom of the water reservoir pan 20. A thermostatically controlled jet discharge valve 31 may be provided to shut off water flow to the jets 30 if the temperature of the water is above a predetermined limit and a filter 32 may be provided between the valve 31 and the jets 30 to prevent clogging of the jets. The discharge orifice of the jets depends upon the water pressure in the supply conduit in order to provide maximum turbulence adjacent the bottom of the pan while at the same time conserving water by providing a minimum discharge through the orifices. The limited flow of water through the jets must provide sufficient heat and turbulence to prevent freezing of the water in the pan 20 at sub-zero temperatures, and the jets will be sized to produce a minimum water flow while still preventing freezing of the water in the pan.

A protective cover or hood 35 is mounted across the top of the housing 15 and encloses the float 27a and the top of the stand pipes 21 and 22 as shown. The hood 35 provides an enclosure for the above-freezing air passing upwardly through the stand pipes 21 and 22 from the lower portion of the hollow support member 10 so that the air trapped below the hood 35 is maintained at an above-freezing temperature. The lower edges of the hood 35 extend below the minimum water level maintained by the float valve 27 in order to provide a seal around the lower edges thereof.

The hood 35 is held in place at the top of the housing 15 by means of a pair of upstanding attachment straps 35a fixed to top flange 15b of the housing 15. These straps 35a extend up through suitable slots 35b formed in the end portions of the hood 35 and retaining pins 35c may be provided to hold the hood 35 in place on the straps 35a. The hood 35 has cut out end portions which are spaced from the inside pan wall to thus permit the warm air from stand pipes 21 and 22 to pass out therethrough and maintain above-freezing temperatures within the hood enclosure. These end spaces are designated by reference character 35d.

The water discharge unit can be easily serviced by removing the hood 35 which exposes assembly A. The flexible conduit 25a permits the entire assembly to be lifted out of the pan for servicing. A shut-off valve 37 is provided at the top of the flexible conduit 25a to permit removal of the water discharge unit if necessary. Insulation 38 may be provided around the upper portion of support member 10.

An alternative form of the invention is illustrated which embodies an auxiliary jet discharge element 40 which is controlled by a second thermostat 41. The purpose of the auxiliary discharge jet is to provide a greater supply of above-freezing water to the reservoir pan when the water temperature therein approaches the freezing point. The temperature of the water entering the pan through the jets is approximately 45° F. which is the sub-surface ground temperature below the frost line, and the supply of BTUs from the water entering through the jets must be sufficient to prevent freezing of the water in the pan even if the livestock are not drinking.

It will be seen that I have provided a highly efficient freeze-proof livestock watering device and method which is very economical to operate, even at sub-zero temperatures.

What is claimed is:

1. A freeze-proof livestock watering device comprising,
   a. a reservoir pan having an open top, insulated side walls and a heat conductive bottom panel,
   b. means supporting the pan in operative position above the ground surface and affording communication between the heat conductive pan bottom and above-freezing ground temperatures,
   c. a water supply conduit extending into the pan reservoir,
   d. a float valve connected to said conduit and mounted in said pan reservoir to prevent the water within the pan from falling below a predetermined minimum level,
   e. turbulence-producing means for agitating the water in said reservoir for preventing freezing thereof,
   f. an upstanding hollow stand pipe member extending upwardly through the bottom of the pan and affording communication between above-freezing ground temperatures below the pan bottom and the upper end of the stand pipe, the upper end of said stand pipe forming an overflow drain positioned to prevent the water in the pan from rising above a predetermined maximum level above the minimum level maintained by the float valve, and
   g. a protective hollow hood member for enclosing the float and the upper end of said drain stand pipe whereby the above-freezing air in the drain stand pipe is confined within the area surrounding said float to prevent freezing thereof.

2. The structure set forth in claim 1 and
   the water supply conduit extending upwardly through said hollow stand pipe member to maintain the conduit at above-freezing temperatures.

3. The structure set forth in claim 1 and drainage means in the bottom of the supporting means communicating with said overflow drain to prevent overflow water from building up at the bottom of said supporting means.

4. The structure set forth in claim 1 wherein the reservoir pan is provided with a peripheral flange element extending outwardly around the upper edge thereof and the insulation surrounding the side walls of the pan overlying said flange to prevent direct exposure of the outside air temperature to said flange.

5. The structure set forth in claim 1 and said turbulence-producing means constituting jet means connected to the conduit independently of the float valve to continuously discharge into the reservoir water only sufficient quantities of water at above-freezing temperature to maintain reservoir water at above-freezing temperatures.

6. The structure set forth in claim 5 and said protective hood member having lower marginal edge portions which are submerged below the water surface to provide a seal for confining the above-freezing air supply under said hood and said hood being provided with vent means to permit said above-freezing air a limited escape path and permit limited circulation of said air through the area confined under said hood.

7. The structure set forth in claim 5 wherein the jet means is designed to discharge substantially less water than is discharged through the float valve when the float valve is open to positively limit the water being discharged through the jet means independently of the float valve.

8. The structure set forth in claim 1 wherein the pan supporting means constitutes a hollow rigid support member extending downwardly into the ground below the frost level to support the pan and provide air communication between the top of said hollow support member and the heat conductive bottom panel of the pan.

9. The structure set forth in claim 8 and a hollow overflow drain stand pipe extending through the bottom of the pan to a point slightly below the top of the pan and permitting the air in the support member to pass upwardly through the stand pipe, the water supply conduit extending up through the stand pipe and having a readily removable mounting provided between the upper end of the conduit and the upper portion of the stand pipe, said stand pipe having a flexible conduit portion extending downwardly therethrough and provided with a slack loop which permits elevation of the upper portion of the conduit above the reservoir pan for servicing of the float valve and jet means connected to said conduit.

10. The structure set forth in claim 1 and a thermostat connected in the conduit portion supplying the jet means to shut off the jet flow when the temperature of the water in the pan rises above a predetermined limit.

11. The structure set forth in claim 10 and a second jet means connected to the supply conduit at a point between said thermostat and the first jet means to provide a supplemental jet water supply, a second thermostat connected with said second jet means to permit water to flow through said second jet means when the temperature of the water in the reservoir pan falls below a predetermined limit to increase the volume of above freezing water being discharged into the reservoir pan.

* * * * *